May 13, 1930.  A. B. JONES  1,758,745
METHOD AND APPARATUS FOR OBTAINING SOLIDS FROM LIQUIDS
Filed Aug. 5, 1926
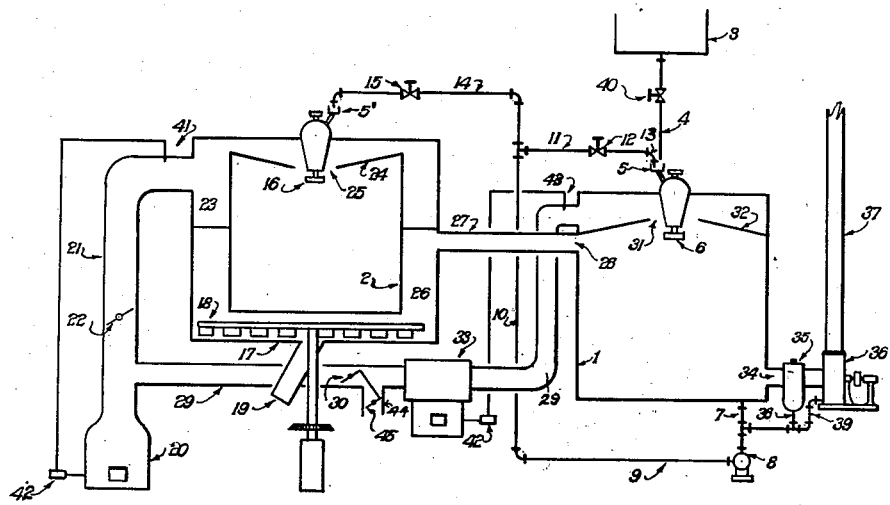
INVENTOR.
Arthur B. Jones.
BY
ATTORNEYS.

Patented May 13, 1930

1,758,745

UNITED STATES PATENT OFFICE

ARTHUR B. JONES, OF PLAINFIELD, NEW JERSEY, ASSIGNOR TO INDUSTRIAL ASSOCIATES, INCORPORATED, OF NEW YORK, N. Y., A CORPORATION OF NEW YORK

METHOD AND APPARATUS FOR OBTAINING SOLIDS FROM LIQUIDS

Application filed August 5, 1926. Serial No. 127,472.

My invention relates to new and useful improvements in method and apparatus for obtaining solids from liquids. Among the objects of my invention may be mentioned the provision of a compact, readily and economically built plant layout, which is flexible in its operating conditions, simply regulated (either automatically or by hand) by which solids may be obtained from solutions or suspensions, incident to spray dispersal thereof into appropriate atmospheres. My invention contemplates spray concentration of the liquid, followed by spray dispersion of the derived concentrate under conditions which result in the production of the desired solids. It also contemplates different temperatures for the gases introduced into the successive spray chambers, when for any reason such different temperatures are desirable—e. g., either for the protection of the solids against heat injury, or for the production of the solids when the product in question is liquefied relatively easily by heat. It also contemplates different degrees of concentration of the raw liquor to meet different requirements. It also contemplates a larger volume of gas in the concentration chamber than in the solidification chamber. The gas from the solidification chamber is also, in many cases, continuously delivered to the concentration chamber for the recovery of entrained fines and to aid in effecting the concentration of the raw liquor, although when treating certain liquor, this may not be desirable. Various other features of my invention will be hereinafter described or understood from an inspection of the accompanying drawing, in which I have indicated, schematically, a single illustrative layout in which my invention may be carried out.

The plant shown comprises a concentration tower or chamber 1, and a solidification chamber or tower 2. The liquor to be treated may be derived from any suitable source, such as a storage tank 3, from which it is discharged through a valve-controlled conduit 4 to the funnel 5 which feeds a centrifugal atomizer 6 arranged in the upper portion of the concentration tower 1. While I prefer a centrifugal atomizer such as 6 for the spray dispersal of the liquid, by reason of its simplicity and effectiveness, it is not essential that a spray device of this particular character be employed.

The concentrate is drawn off through pipe 7 from the bottom of the tower and is driven by pump 8 through the line 9. The riser 10 of this line is branched, one branch 11 leading past valve 12 to a down leg 13 which opens to the funnel 5. The second branch 14 from the riser 10 leads the concentrate past valve 15 to the atomizer 16 arranged in the upper portion of the solidification chamber 2. Inasmuch as the concentrate derived from the tower 1 may be such that it cannot be efficiently handled by nozzle, impact or similar spray devices, I regard it as desirable for the efficient operation of the present process that the atomizer 16 be of the centrifugal type, preferably of the high speed type (5,000 to 10,000 R. P. M. or more) set forth in the Patents Nos. 1,624,847 and 1,676,113 of Champlain L. Riley and in the copending applications of Champlain L. Riley, Ser. Nos. 97,136 and 98,838, although these particular constructions are not essential.

The solids produced in the solidification chamber 2 fall to the floor 17 thereof, and are swept out by the rotary rake 18 through discharge spout 19 to a storage bin, a suitable conveyor or packaging apparatus, or are otherwise handled as may be desired.

Through both chambers pass currents of gas. In the layout shown I have indicated the derivation of the gas for both chambers from a single heater 20, which discharges through branch 21 past regulating damper 22 to an annular chamber 23 surrounding the upper portion of the solidification chamber 2, and passes over the inwardly dished top 24 of the latter to the inlet port 25, below, but adjacent, which the nebulizer 16 is arranged. The gases passing downward through the chamber 2 escape around the lower margin thereof and enter the surrounding annular space 26, carrying with them in suspension those fines which are so light that they are not deposited upon the floor 17.

The exit gases, with their entrained fines, are led through pipe 27 to chamber 1, entering the latter through port 28 into the portion of the chamber more or less filled by the atomized liquor from the spray device. These gases, although materially chilled in chamber 2, possess valuable heat units and are capable of aiding, to a limited extent, in the extraction of moisture from spray delivered to the concentration chamber. Moreover, the fines entrained by these gases from chamber 2, are scrubbed out by the spray in chamber 1, and thus increase the concentration of the liquor derived from this chamber. In some instances these fines are of such nature that subjection to high temperature is disadvantageous. By introducing the gases from chamber 2 into the spray of chamber 1, they are protected from injury by the hot gases which constitute the main concentrating agent in this chamber.

These hot gases are derived, in the layout indicated, from the heater 20, through the branch conduit 29 which leads the gases past damper 30 to the top of the concentrating chamber 1, whence they pass downward through the port 31 in the top diaphragm 32 (preferably of heat-insulating material) which forms the upper wall or roof of the chamber 1, and enter the nebula zone at its densest point. This gas introduced into chamber 1 may safely be at a temperature as high as, or higher than, that of the gas introduced into the solidification chamber 2. The conduit 29 may pass through an auxiliary heater 33, of any suitable type. It will be understood, of course, that the gases entering the concentration tower may be derived from an independent heater; in which case the conduit 29 would lead to chamber 1 from such an independent heater substituted for the auxiliary heater 33 diagrammatically indicated. In either case, the temperature of the gases at entry into the chambers 1 and 2, may be regulated to afford the heat desired in each chamber and appropriate to the work effected therein.

The moisture laden gases from the concentrating tower exit at 34. A certain quantity of concentrate in the form of mist (other than absorbed moisture) is carried out by the gases. To recover this concentrate, the gases are preferably passed through a baffle 35 to the suction fan 36 which discharges to the stack 37. The liquid from the baffle 35 and from the fan 36 may be led either to the pump 8 through pipes 38 and 39, or they may be returned by an auxiliary pump (not shown) to the storage tank 3.

Inasmuch as the gas from the solidification chamber 2 passes into the concentration tower 1 together with the fresh hot gas from conduit 29, the fan 36 must have a capacity sufficient to maintain the circulation of the gas through both chambers. Assuming that 6000 cubic feet of gas per minute enter the solidification chamber 2, through conduit 21, and 7000 cubic feet per minute enter the concentration tower through the conduit 29, the fan 36 must have sufficient capacity to deliver 13,000 cubic feet of gas per minute.

It will also be understood that when treating liquors which are solidified in chamber 2 by chilling, rather than by absorption of moisture, it may not be desired to introduce the gases from chamber 2 into chamber 1. However, I regard such practice as desirable since even in such case, the gas in chamber 2 is somewhat warmed by the liquor, and moreover, it is dried by the absorption of moisture therefrom by the solids as they chill. Consequently, the gas from chamber 2 is, in most cases, capable of absorbing moisture and, therefore, of doing useful work in the concentrating chamber.

The method of operation will be readily understood. Assuming that the plant is to be started into operation upon a liquor which on a single passage through chamber 1 is not sufficiently concentrated to yield the desired solid in chamber 2. Under such conditions valve 15 is closed and valve 12 opened, as well as the valve 40 in the feed conduit 4. The atomizer 6 is set in motion and the pump 8 started. The damper 22 may be closed, the damper 30 in the branch 29 opened wide, and suction fan 36 set in operation. A sufficient quantity of liquor having been admitted past the valve 40, the latter is closed or partially closed, and the liquor circulated through the circuits 7, 8, 9, 10, 11, until the desired concentration is effected. The valve 12 is then partially shut, the valve 15 partially opened, as well as the valve 40. The regulation of the valves is such that a portion of the concentrate now flows past valve 15 to the solidification chamber, while another portion flows past valve 12 and mingles with the raw liquor from the source 3 in such proportions that the desired concentration of the liquor which exits at 7 is maintained during the subsequent operation of the apparatus. The concentrate passing the valve 15 is discharged to the nebulizer 16, the dampers 22 and 30 being adjusted to insure flow of gas in proper proportion through chamber 2. The heavy solids deposited on the floor of this chamber are swept into the discharge chute 19 by the rake 18. The gas from the solidification chamber, with its entrained light solids, enters chamber 1, where the solids are taken up and enter the concentrate which leaves the concentrating tower at 7.

In order to regulate the temperature of the gas which enters the solidification chamber, I prefer to arrange, near its entry port into the chamber, a thermostat 41 which may control either a damper (not shown) admitting cool air to the riser 21, or the heating unit 42, such as a gas flame or oil burner, of the air heater 20. A similar thermostat 43 may be arranged in the conduit 29 to control the heater 33 or the damper 30; but the danger of excessive temperature of the gas entering the concentrating chamber is less, since solids are not produced in this chamber.

If desired the raw liquor from the source 3 may be preheated before it is fed to the nebulizer 6.

I have referred to heat injury to solids entrained by the discharge gases which leave the solidification chamber 2 and enter the concentrating tower 1. This is a consideration of importance when desiccating such fluids as milk, the solids of which cannot be subjected to a temperature of over 180° F. without having an unpleasant flavor imparted thereto. The method and apparatus, however, are by no means limited to the treatment of such liquids, and in some cases the temperature of the gas entering and leaving the solidification chamber 2 may be much higher than this. Again, certain liquors, properly concentrated, solidify upon chilling. In such case the gases entering the solidification chamber 2 may not be heated at all, and it may be necessary to heat the pipe 9 which leads the concentrate to the solidification chamber, and also to heat the exit gases through conduit 27.

Whatever the character of the liquor, the solid product derived from chamber 2 may be varied in its physical characteristics, (for example in the size of the solid particles) by altering the fineness of the spray dispersed by the nebulizer 16 (through variations in the speed of the latter), or by varying the concentration of the liquor derived from chamber 1. The latter may be accomplished in various ways—e. g. (1) by increasing or decreasing the feed of the raw liquor; (2) dropping or raising the temperature or quantity of gas delivered to chamber 1; (3) enlarging or restricting the valve opening at 12. The flexibility of operating conditions is practically limitless, and may be readily adapted to the nature of the raw liquor and the final solid product.

Various modifications will readily occur to those dealing with the problem. For example it may be desirable to use more than one concentrating chamber arranged in series or arranged in parallel and jointly feeding to a single solidifying chamber, upward instead of downward, as shown, or in one tower the gases may pass downward and in the other upward and vice versa.

I have also indicated at 44 an air inlet to the gas conduit 29, said inlet being controlled by a damper 45, preferably connected to the damper 30 for simultaneous operation therewith. This arrangement permits all the gas for heater 33 to be taken from a source independent of heater 20, or partially from either source, or wholly from heater 20.

The thoughts which underlie the invention are not confined to the particular layout which I have used to describe a single embodiment thereof, and many variations may be made which fall within the scope of what I claim as my invention.

I claim—

1. The method of obtaining solids from liquid, which comprises spraying the liquid in a concentrating chamber, spraying the concentrate, as produced, in a solidification chamber, passing a current of gas in series through the solidification and concentration chambers in the sequence specified, and introducing into the concentration chamber a supplemental current of gas at a temperature higher than the exit temperature of the gas from the solidification chamber.

2. The method of obtaining solids from liquid, which comprises spraying the liquid in a concentrating chamber, spraying the concentrate, as produced, in a solidification chamber, passing a current of gas in series through the solidification and concentration chambers in the sequence specified, and introducing independently into the concentration chamber a supplemental current of gas at a temperature higher than the exit temperature of the gas from the solidification chamber.

3. The method of obtaining solids from liquid, which comprises spraying the liquid in a concentrating chamber, spraying the concentrate, as produced, in a solidification chamber, passing a current of gas in series through the solidification and concentration chambers in the sequence specified, and introducing into the concentration chamber a supplemental current of gas at a temperature higher than the exit temperature of the gas from the solidification chamber, said higher temperature gas being brought into contact with the sprayed liquor before mingling to substantial extent with the exit gases from the solidification chamber.

4. The method of obtaining solids from liquid, which comprises concentrating the liquid by subjecting it in finely divided condition to the action of a current of heated gas, followed by dispersion of the liquid concentrate in finely divided condition in a moisture absorbent gaseous current, said latter current being introduced, with its entrained fines, into the concentrating chamber to augment the volume of gas in the concentrating region.

5. The method of obtaining solids from liquid, which comprises concentrating the liquid by subjecting it in finely divided condition to the action of a current of heated gas, followed by dispersion of the liquid concentrate in finely divided condition in a moisture absorbent gaseous current, said latter current being introduced, with its entrained fines, into the concentrating chamber at a point removed from that at which said current of heated gases enter the latter.

6. The method of obtaining solids from liquid, which comprises concentrating the liquid by subjecting it in finely divided condition to the action of a current of heated gas, followed by dispersion of the liquid concentrate in finely divided condition in a moisture absorbent gaseous current, said latter current being introduced, with its entrained fines, into the concentrating chamber at a point beyond the entry point of the heated gases in the direction of flow of the said heated gases.

7. The method of obtaining solids from liquid, which comprises subjecting the latter in concentrated form, but dispersed condition, to the action of a current of gas, and leading such gas, together with a supplemental current of gas, into contact with the liquid, in dispersed condition, to concentrate it.

8. The method of obtaining solids from liquid, which comprises subjecting the latter in concentrated form, but dispersed condition, to the action of a current of gas, and leading such gas, together with a supplemental current of gas at higher temperature, into contact with the liquid, in dispersed condition, to concentrate it.

9. The method of obtaining solids from liquid, which comprises heating independent gaseous currents to different temperatures and leading the current of lower temperature to a solidification chamber, and the current of higher temperature to a concentration chamber, dispersing liquid in the latter to effect its concentration, and leading the concentrate to, and dispersing it in, the solidification chamber, the gaseous current, with its entrained fine solids from the latter being also introduced into the concentration chamber.

10. Apparatus for recovering solids from liquids, comprising a concentration chamber and a solidification chamber, means for passing a current of gas through the solidification and concentration chambers in series in the sequence stated, and means for passing into the concentration chamber an auxiliary current of gas.

11. Apparatus for recovering solids from liquids, comprising a concentration chamber and a solidification chamber, means for passing a current of gas through the solidification and concentration chambers in series in the sequence stated, and means for passing into the concentration chamber an auxiliary current of gas at higher temperature than the exit gases from the solidification chamber.

12. Apparatus for recovering solids from liquids, comprising a concentration chamber and a solidification chamber, means for passing a current of gas through the solidification and concentration chambers in series in the sequence stated, and means for passing into the concentration chamber an auxiliary current of gas at a temperature higher than that of the exit gases from the concentration chamber, and means for heating both of said currents.

13. Apparatus for the recovery of solids from liquids, comprising a concentration chamber and a solidification chamber, means for delivering liquid in finely divided form in each of said chambers, means for passing a current of gas from the solidification chamber to the concentration chamber, means for passing into the concentration chamber an auxiliary current of gas at a temperature higher than that of the gas derived from the solidification chamber, the latter current being introduced into the concentration chamber at a point removed from the entry port for the gas of higher temperature.

14. Apparatus for recovering solids from liquids, comprising a concentration chamber and a solidification chamber, means for passing a current of gas through the solidification and concentration chambers in series in the sequence stated, and means for passing into the concentration chamber an auxiliary current of gas at higher temperature than the exit gases from the solidification chamber, together with a common exit port for both of said gas currents in the concentration chamber.

In testimony whereof I have signed my name to this specification.

ARTHUR B. JONES.